July 23, 1957  R. D. PIKE  2,800,392
SYSTEM FOR THE RECOVERY OF NITRIC OXIDE
Filed July 22, 1952  2 Sheets-Sheet 1

ABSORBTION OF $NO_2$ ON SILICA GEL
AT VARIOUS TEMPERATURES

INVENTOR.
Robert D. Pike
BY
ATTORNEYS

July 23, 1957 R. D. PIKE 2,800,392
SYSTEM FOR THE RECOVERY OF NITRIC OXIDE
Filed July 22, 1952 2 Sheets-Sheet 2

INVENTOR.
Robert D. Pike
BY
ATTORNEYS

United States Patent Office 2,800,392
Patented July 23, 1957

2,800,392

SYSTEM FOR THE RECOVERY OF NITRIC OXIDE

Robert D. Pike, Greenwich, Conn.; Kenneth B. Ray and The Stamford Trust Company, executors of said Robert D. Pike, deceased Application July 22, 1952, Serial No. 300,205

4 Claims. (Cl. 23—161)

This invention is a continuation-in-part of my application Serial No. 20,672, filed April 13, 1948, now U. S. Patent 2,647,822 and relates to a system and apparatus for the recovery of nitric oxide in useful form from gaseous mixtures containing nitric oxide in relatively small concentration.

In the manufacture of nitric oxide by the reaction of nitrogen and oxygen at high temperature in fuel fired and electrically heated furnaces, the amount of nitric oxide in the furnace discharge gases is relatively low, usually of the order of .5% to 4.6%, and the efficient recovery of the nitric oxide in this dilute form from the furnace gases is an important factor in the economical operation of any such nitric oxide manufacturing operation.

The system and apparatus for the recovery of nitric oxide which is described herein are designed primarily for use with my invention, "Method and Apparatus for Making Nitric Oxide," application Serial No. 150,409, filed March 18, 1950, now U. S. Patent 2,643,936 but may be used with nitric oxide containing gases derived from other sources.

One of the objects and advantages of my invention is to provide a method and apparatus for the recovery of nitric oxide from furnace or other gases containing the same which will be more efficient and more economical than the methods heretofore used.

Another object of my invention is to refrigerate the nitric oxide containing gas, as well as the silica gel beds used for catalytic oxidation and adsorption, to such a low temperature as to greatly increase the amount of $NO_2$ adsorbed per unit of silica gel.

Another object of my invention is to provide a method for the recovery of nitric oxide from furnace or other gases containing relatively high concentrations of nitric oxide, say of the order of 4.6%, without the necessity for using unwieldably large apparatus.

Another object of my invention is to make the process continuous by applying the gases for treatment by the silica gel in fluidized solid beds of silica gel which contain refrigerating coils buried in the turbulent gel, whereby the relatively large amount of heat which is released by the actions of catalysis, polymerization and adsorption is removed as it is generated, thus preserving the optimum low temperature of the reaction of adsorption which, in a preferred embodiment, is about $-8°$ C. At this temperature 100 gms. silica gel will adsorb about 35 gms. of $NO_2$, or about five times the amount which it will adsorb at $15.5°$ C.

Another object of my invention is to accomplish desorption of the entire $NO_2$ and $N_2O_4$ content of the silica gel by passing heated air through a fluidized solid bed of gel to produce a gas containing about 19.5% $NO_2$ which is a preferable concentration for forming nitrates in water solution.

Another object of my invention is to revive the warm desorbed silica gel for further use by immediately passing it into a fluidized solid bed receiving cold $NO_2$ containing gas and provided with refrigerating coils whereby the desired low temperature of the vessel is quickly restored.

Another object of my invention is to directly produce a solution of potassium nitrate by passing the desorbed gas containing about 19.5% $NO_2$ into a solution of potassium hydroxide and recycling the relatively small amount of NO containing gas produced in the nitrate-forming reaction, after dehumidification, back to the fluidized solid bed of silica gel used for catalytic oxidation, whereby substantially all of the NO produced in the nitrating reaction may be recovered and reused.

While the process is herein described as used with fluidized solid silica gel beds, it will be understood that in many of its applications fixed beds of silica gel may be used and that it is my intention that the claims of this application, unless they otherwise so specify, shall cover the process steps whether used with fixed or fluidized silica gel beds.

Referring now to the drawings.

Figure 1:
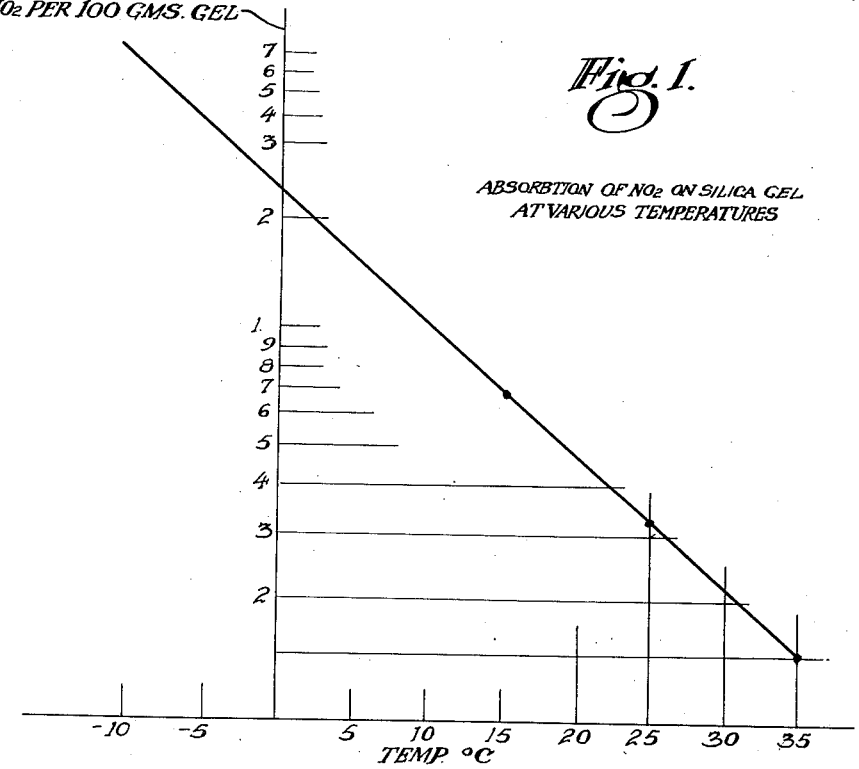
Fig. 1 shows the grams of $NO_2$ adsorbed per 100 gms. of silica gel at $35°$, $25°$ and $15°$ C. and by extrapolation, the approximate amount adsorbed at lower temperatures.

As indicated on the semi-logarithmic graph of Fig. 1, the adsorption of $NO_2$ on silica gel, expressed as grams of $NO_2$ adsorbed per 100 gms. of silica gel, increases rapidly as the temperature of the silica gel decreases. Thus at $35°$ C. less than 2 gms. of $NO_2$ per 100 gms. of silica gel are adsorbed, but at $15°$ C. approximately 7 gms. of $NO_2$ per 100 gms. of silica gel are adsorbed, and the amount of $NO_2$ adsorbed goes up as the temperature of the silica gel is reduced so that at an adsorption temperature maintained at $-8°$ C. the amount of $NO_2$ adsorbed per 100 gms. of silica gel is of the order of five times larger than the amount adsorbed at $15°$ C.

By increasing the concentration of $NO_2$ in the gases, the grams of $NO_2$ adsorbed on silica gel are also increased such that doubling the concentration of $NO_2$ in the gases passing through the silica gel beds will increase the amount of adsorption as much as threefold.

Thus, by reducing the temperature of the silica gel beds from approximately $15°$ C. to $-8°$ C. and doubling the concentration of $NO_2$ in the gases passing through the adsorption beds, an increase in adsorption of the order of 15 to 1 may be realized.

The efficiency at which silica gel adsorbs $NO_2$ decreases as $NO_2$ is adsorbed. With a fixed bed of silica gel the adsorption of $NO_2$ will be substantially 100% efficient at the beginning of the adsorbing operation, but after a period of time the efficiency of the adsorption begins to fall off and as the fixed bed of silica gel approaches saturation with $NO_2$, less of the $NO_2$ is adsorbed and more of the $NO_2$ passes through the bed and escapes from the adsorption chamber. However, by using a fluidized solid bed of silica gel in which revived silica gel is constantly introduced into the adsorption chambers and silica gel on which $NO_2$ has been adsorbed is constantly removed, the efficiency of adsorption can be maintained substantially constant in this respect.

Figure 3:
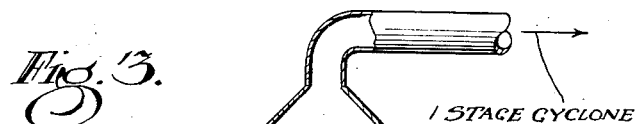
Fig. 3 shows a typical fluidized solid vessel with silica gel as the fluidized solid material such as is used in the process of Fig. 2.
Figure 2:
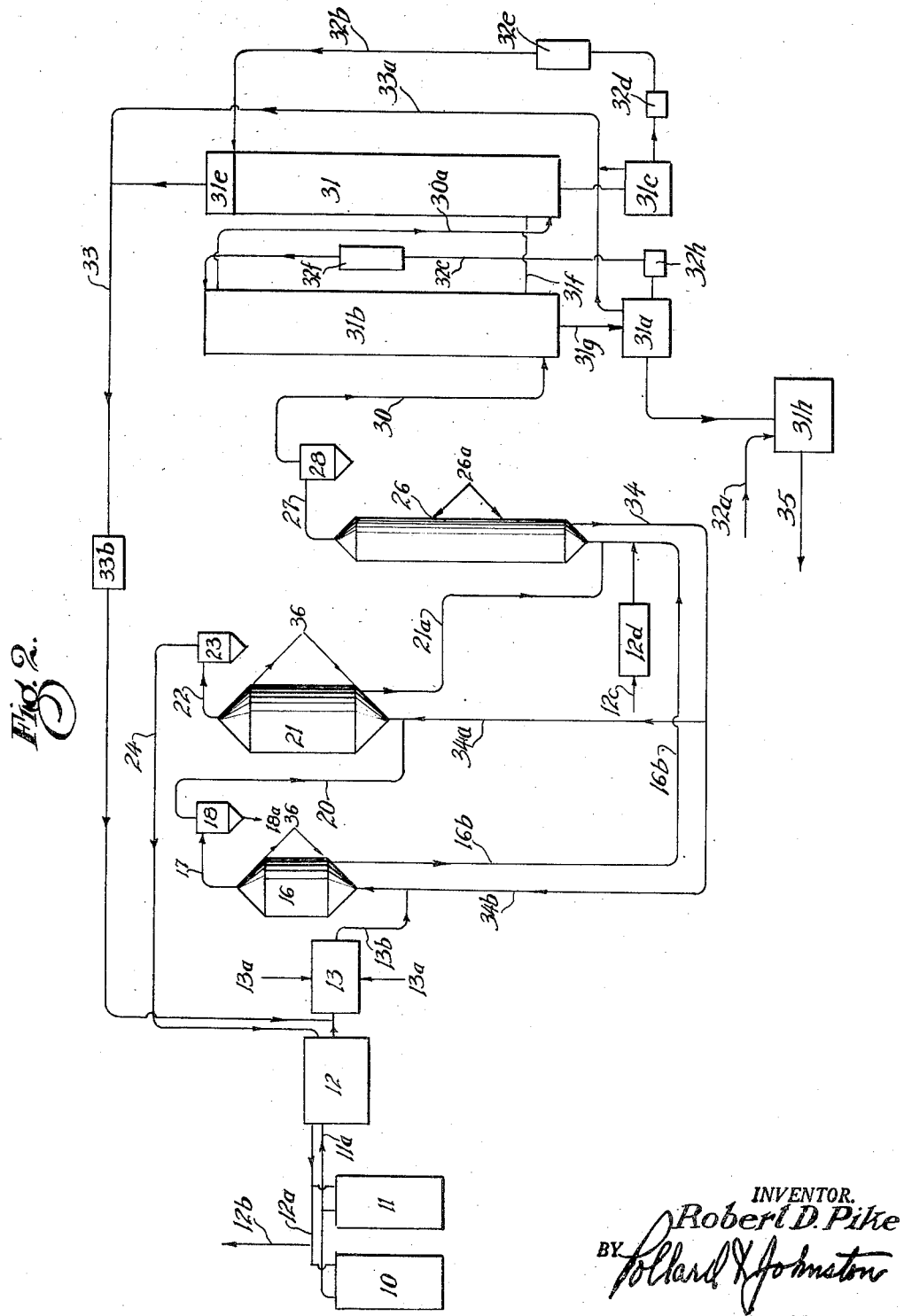
Fig. 2 illustrates a diagrammatic representation of my preferred adsorption and desorption process.

In the drawings Fig. 2 and 3 an apparatus and process are diagrammatically illustrated in which these advantages will be attained. In these figures 10 and 11 indicate the reaction vessels of nitric oxide making furnaces preferably of the type disclosed in my application Serial No. 150,409. It will be assumed, for illustrative purposes, that these furnaces will be operated on air, producing a gas containing 2.8% NO which, at a temperature of about 500° F., flows in line 11a to heat exchanger 12. Cold barren gas flows countercurrent through 12 and is supplied from line 24. The heat exchanger 12 cools the warm furnace gas to about 49° C. and when running on air the returned gas from 24, after being used to cool the warm furnace gas, is discharged and wasted through the line 12b. The cooled furnace gas from 12 enters refrigerator 13 which is supplied with a suitable refrigerant by inlet and outlet lines 13a. This refrigerant cools the gas preferably to not over about −8° C. The gas then passes to fluidized solid silica gel vessel 16 through line 13b, being joined by revived silica gel through line 34b. The reaction in 16 is that of catalytic oxidation of the NO content of the gas to $NO_2$ by silica gel carrying adsorbed $NO_2$ followed by polymerization to $N_2O_4$. Sufficient of the silica gel carrying adsorbed $NO_2$ is removed through line 16b for revival so as to maintain the activity of the bed in 16 at a desired optimum. It will be understood that if some water escapes the refrigerator 13 and passes with the gas into 16, the activity of the gel will be reduced and this water will have to be removed by revival.

As described in my copending application Serial No. 150,409, my nitric oxide process is operated in such a way that the nitric oxide containing gas is practically free from products of combustion and as the air fed to reaction furnaces 10, 11 can be dehumidified, the gas entering 13 is relatively free of moisture. Nevertheless, I prefer to provide means for defrosting the coils in 13 at suitable intervals and so prefer to provide two or more units 13 so that the defrosting will not interfere with the continuity of the process. Any water vapor which finally escapes into 16 is removed with the silica gel for revival in the line 16b.

The fluidized solid vessel 16 is provided with refrigerator coils 36 which are designed to remove the exothermic heat liberated by the reactions resulting from the oxidation of NO to $NO_2$ and the polymerization of $NO_2$ to $N_2O_4$ while maintaining a temperature in the silica gel of not over about −8° C. These coils also provide sufficient refrigeration to remove the sensible heat above −8° C. in the desorbed silica gel which returns in a warm condition through the line 34b after having been desorbed by treatment with hot air. The cold gas in line 13b meets the warm desorbed gel in line 34b and together enter the fluidized solid bed 16.

The fully oxidized gas from 16 passes through line 17 to dust collecting cyclone 18 and the gas, freed from dust, passes through line 20 en route to $NO_2$ adsorbers 21. These are also fluidized solid beds of silica gel provided with integral refrigerating coils 36 which maintain a temperature of −8° C. and supply sufficient refrigeration to remove the exothermic heat of adsorption as well as the sensible heat of the warm desorbed gel above −8° C. The latter, returning from desorption in line 34a, meets the cold oxidized gas in line 20 and together enter the fluidized solid bed or beds 21. The gas issuing through line 22, now stripped of its $NO_2$ content, passes through cyclone dust collector 23. It is at a temperature of about −8° C. and substantially free of $NO_2$ and passes through the heat exchanger 12 on its way to discard line 12b.

Sufficient of the silica gel to maintain a highly efficient operation in 21 is withdrawn through line 21a and sufficient silica gel to maintain efficient operation in bed 16 is withdrawn through line 16b and, meeting the hot air from heater 12d, these together enter the fluidized solid bed 26. The silica gel dust removed at 18a from the cyclone 18 and the silica gel dust removed in the cyclones 23 and 28 may be reintroduced into the silica gel circuit at any convenient point. Air enters heater 12d through line 12c and passing suitable surfaces for heat exchange is heated for desorption by fuel fired at 12e.

Fluidized solid bed 26 is not provided with refrigerator coils but sufficient hot air at a suitable temperature enters with the silica gel carrying the adsorbed $NO_2$ to remove all of the adsorbed $NO_2$ as a gas containing about 19.5% $NO_2$ by volume. The heating effect in desorber 26 may be assisted by the use of high pressure steam pipe coils 26a which, if used, are preferably situated about midway the height. The warm desorbed silica gel from 26 enters line 34 and the major part goes back at 21 through line 34a, the balance passing through line 34b and back to 16. It will be understood that the reaction of adsorption taking place in 21 is the major operation using silica gel and for this reason the vessel 21 is somewhat larger in both diameter and height than the vessel 16. Because only about 15% of the total gas flow from the furnaces passes through desorbing fluidized solid vessel 26, it is desirable to make it considerably smaller in diameter than 21, but the height is made considerably greater than the height of 21 so as to provide a sufficient time of residence in the vessel for the silica gel being desorbed.

The warm gas leaving 26 goes through line 27 to cyclone dust collector 28 and thence through line 30 to the recovery system where preferably a solution of potassium nitrate is produced as the product. This gas contains, as stated, about 19.5% $NO_2$ by volume, and it goes to the bottom of packed acidic tower 31b which operates at about 30° C. and thence, leaving at the top, is conveyed in line 30a to the bottom of packed alkali tower 31 which operates at not over 50° C. A supply of KOH, or other suitable alkali, such as sodium hydroxide or ammonium hydroxide, in water solution enters the top of alkali tower 31 at the bottom of spray entrainment zone 31e. The part of the flow through 31 which recirculates flows into sump 31c and is pumped by pump 32d through cooler 32e which maintains the temperature at not over about 50° C., which is necessary to prevent the formation of potassium nitrite, and thence back to the top of the tower, entering with the fresh solution of KOH, or other alkali, at the bottom of spray entrainment zone 31e.

A part of the solutiton in 31 leaves through pipe 31f and enters the bottom of the acidic tower 31b. The liquor from 31b leaves the bottom through pipe 31g and flows into sump 31a. A portion of this liquor is recirculated by pump 32h into line 32c through a heat exchanger 32f which may operate as either a heater or a cooler to keep the temperature in the acidic tower 31b at about 30° C. The net advance flow of solution goes to sump 31h where it is neutralized by the addition of KOH or other alkali solution through pipe 32a. The net production of solution of potassium nitrate or other alkali nitrate leaves the system through pipe 35.

In the sumps 31a and 31c a small part of the nitric oxide is liberated and passes through the line 33a into pipe 33 which is also connected to the stripper 31e at the top of the basic tower 31. The nitric oxide escaping from these points, which is only a small part of the circulating main flow of nitric oxide which passes into the collecting system, passes through a dehumidifier 33b and thence enters the main stream of nitric oxide from the furnaces 10 and 11 adjacent the entrance into the refrigerator 13. This recycled nitric oxide thus increases the NO content of the gases passing into the collecting system and by virtue of the increased NO content which is refrigerated and oxidized to $NO_2$ in the recovery system and the greater adsorption of $NO_2$ by the silica gel because of the increased concentration, leads to the recovery of this escaping NO without imposing any material increased burden on the recovery system, because of the relatively small volume of gas leaving 31 as compared with the gas leaving the furnace 10, 11, that is about 15%.

Fig. 3 shows a typical fluidized solid vessel with silica gel as the fluidized solid material, such as the vessels designated by 16 and 21 in Fig. 2. The vessel designated as 26 in Fig. 1 is of the same type, except for the fact that the refrigerator coils are not used, since the action is that of desorption, usually requiring heated air.

It will be understood that the process and apparatus of this invention will serve advantageously in recovering NO values from other NO-containing gases, such as those containing relatively high concentrations of NO, say of the order of 4.6%.

While I have illustrated and described a preferred embodiment of my process and apparatus in diagrammatic form, it will be readily understood by persons skilled in the art that various changes may be made in the process and equivalent forms of apparatus may be used without departing from the spirit of my invention or the scope of the appended claims.

What is claimed is:

1. A continuous process for recovering oxides of nitrogen occurring in small concentrations in a gas, comprising flowing a gaseous stream containing nitric oxide upwardly through an oxidizing zone and oxidizing the nitric oxide therein in contact with a fluidized solid bed of silica gel maintained at a temperature below 0° C. and maintained in the oxidizing zone as a fluidized bed by the upwardly flowing gas, flowing a gaseous stream containing the formed nitrogen peroxide upwardly through an adsorption zone and adsorbing the nitrogen peroxide therein in a fluidized solid bed of silica gel maintained at a temperature below 0° C. and maintained in the adsorption zone as a fluidized bed by the upwardly flowing gas, continually withdrawing silica gel from the oxidation zone, continually withdrawing silica gel from the adsorption zone, combining the silica gel withdrawn from said zones, heating the combined silica gel with a stream of heated air in a desorption zone to remove the nitrogen peroxide therefrom, and continually returning desorbed silica gel to said oxidating and adsorption zones to replace silica gel withdrawn therefrom.

2. A continuous process for recovering oxides of nitrogen occurring in small concentrations in a gas, comprising flowing a gaseous stream containing nitric oxide upwardly through an oxidizing zone and oxidizing the nitric oxide therein in contact with a fluidized solid bed of silica gel maintained at a temperature below 0° C. by refrigeration means imbedded in the fluidized bed and maintained in the oxidizing zone as a fluidized bed by the upwardly flowing gas, flowing a gaseous stream containing the formed nitrogen peroxide upwardly through an adsorption zone and adsorbing the nitrogen peroxide therein in a fluidized solid bed of silica gel maintained at a temperature below 0° C. by refrigeration means imbedded in the fluidized bed and maintained in the adsorption zone as a fluidized bed by the upwardly flowing gas, continually withdrawing silica gel from the oxidation zone, continually withdrawing silica gel from the adsorption zone, combining the silica gel withdrawn from said zones, heating the combined silica gel with a stream of heated air in a desorption zone to remove the nitrogen peroxide therefrom and continually returning desorbed silica gel to said oxidating and adsorption zones to replace silica gel withdrawn therefrom.

3. A continuous process for recovering oxides of nitrogen produced by the reaction of nitrogen and oxygen in a furnace at high temperatures, comprising flowing a gaseous stream containing nitric oxide upwardly through an oxidizing zone and oxidizing the nitric oxide therein in contact with a fluidized solid bed of silica gel maintained at a temperature below 0° C. by refrigeration means imbedded in the fluidized bed and maintained in the oxidizing zone as a fluidized bed by the upwardly flowing gas, flowing a gaseous stream containing the formed nitrogen peroxide upwardly through an adsorption zone and adsorbing the nitrogen peroxide therein in a fluidized solid bed of silica gel maintained at a temperature below 0° C. by refrigeration means imbedded in the fluidized bed and maintained in the adsorption zone as a fluidized bed by the upwardly flowing gas, continually withdrawing silica gel from the oxidation zone, continually withdrawing silica gel from the adsorption zone, combining the silica gel withdrawn from said zones, heating the combined silica gel with a stream of heated air in a desorption zone to remove the nitrogen peroxide therefrom, recovering the nitrogen peroxide removed from the desorption zone by contacting it with an aqueous alkali solution, recovering nitric oxide gases espaing from said solution and adding them to the gases from said furnace, and continually returning desorbed silica gel to said oxidating and adsorption zones to replace silica gel withdrawn therefrom.

4. A continuous process for recovering oxides of nitrogen occurring in small concentrations in a gas, comprising flowing a gaseous stream containing nitric oxide upwardly through an oxidizing zone and oxidizing the nitric oxide therein in contact with a fluidized solid bed of silica gel maintained at a temperature below —7° C. by refrigeration means imbedded in the fluidized bed and maintained in the oxidizing zone as a fluidized bed by the upwardly flowing gas, flowing a gaseous stream containing the formed nitrogen peroxide upwardly through an adsorption zone and adsorbing the nitrogen peroxide therein in a fluidized solid bed of silica gel maintained at a temperature below —7° C. by refrigeration means imbedded in the fluidized bed and maintained in the adsorption zone as a fluidized bed by the upwardly flowing gas, continually withdrawing silica gel from the oxidation zone, continually withdrawing silica gel from the adsorption zone, combining the silica gel withdrawn from said zones, heating the combined silica gel with a stream of heated air in a desorption zone to remove the nitrogen peroxide therefrom and continually returning desorbed silica gel to said oxidating and adsorption zones to replace silica gel withdrawn therefrom.

References Cited in the file of this patent

UNITED STATES PATENTS

| | | |
|---|---|---|
| 1,057,052 | Guye | Mar. 25, 1913 |
| 1,348,227 | La Cour | Aug. 3, 1920 |
| 1,949,462 | Fogler | Mar. 6, 1934 |
| 2,568,396 | James | Sept. 18, 1951 |
| 2,578,674 | Daniels et al. | Dec. 18, 1951 |
| 2,647,822 | Pike | Aug. 4, 1953 |
| 2,674,338 | Lindsay et al. | Apr. 6, 1954 |